(12) United States Patent
Choi

(10) Patent No.: US 8,537,319 B2
(45) Date of Patent: Sep. 17, 2013

(54) LIQUID CRYSTAL DISPLAY AND METHOD FOR FABRICATING THE SAME

(75) Inventor: Kyung-Ho Choi, Ulsan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 756 days.

(21) Appl. No.: 11/282,380

(22) Filed: Nov. 18, 2005

(65) Prior Publication Data
US 2006/0114401 A1 Jun. 1, 2006

(30) Foreign Application Priority Data
Nov. 26, 2004 (KR) .................. 10-2004-0098249

(51) Int. Cl.
*G02F 1/136* (2006.01)
*G02F 1/1343* (2006.01)

(52) U.S. Cl.
USPC .............................. 349/143; 42/43

(58) Field of Classification Search
USPC ................. 349/42, 143, 43, 142, 146
See application file for complete search history.

(56) References Cited

U.S. PATENT DOCUMENTS

| | | | |
|---|---|---|---|
| 2002/0008796 A1* | 1/2002 | Kung | 349/42 |
| 2002/0057403 A1* | 5/2002 | Yasukawa et al. | 349/110 |
| 2003/0020857 A1* | 1/2003 | Konno et al. | 349/123 |
| 2003/0086042 A1* | 5/2003 | Lee et al. | 349/123 |
| 2003/0107694 A1* | 6/2003 | Song | 349/129 |
| 2003/0128178 A1* | 7/2003 | Murade | 345/87 |

FOREIGN PATENT DOCUMENTS

| | | |
|---|---|---|
| JP | 10-142638 | 5/1998 |
| JP | 2002-268093 | 9/2002 |
| JP | 2003-129052 | 5/2003 |
| JP | 2004-302464 | 10/2004 |
| KR | 2001-0094402 | 11/2001 |
| WO | WO 2004011999 A1 * | 2/2004 |

OTHER PUBLICATIONS

Patent Abstracts of Japan, Publication No. 2002-268093, dated Sep. 18, 2002, in the name of Hirofumi Yamakita et al.
Patent Abstracts of Japan, Publication No. 2004-302464, dated Oct. 28, 2004, in the name of Chang-Hun Lee et al.
Korean Patent Abstracts, Publication No. 1020010094402 A, dated Nov. 1, 2001, in the name of Chang Hun Lee et al.
Office action dated Sep. 8, 2009 for corresponding Japanese Patent Application No. 2005-340888.

* cited by examiner

*Primary Examiner* — Jessica M Merlin
(74) *Attorney, Agent, or Firm* — Christie, Parker & Hale, LLP

(57) ABSTRACT

A liquid crystal display and a method for fabricating the liquid crystal display are provided. The liquid crystal display includes: a first substrate; scan lines arranged in a first direction on the first substrate; data lines arranged in a second direction such that the data lines cross the scan lines; pixel regions defined by the scan lines and the data lines; a thin film transistor region positioned on a cross region of the scan lines and the data lines such that the thin film transistor region is positioned over at least two of the pixel regions; pixel electrodes overlapped with at least a part of the thin film transistor region while being positioned on the pixel regions; a second substrate positioned apart from the first substrate and equipped with a common electrode, the second substrate opposing the first substrate; and a liquid crystal layer interposed between the first substrate and the second substrate.

18 Claims, 4 Drawing Sheets

LIQUID CRYSTAL DISPLAY AND METHOD FOR FABRICATING THE SAME

CROSS REFERENCE TO RELATED APPLICATION

This application claims priority to and the benefit of Korean Patent Application No. 10-2004-0098249, filed on Nov. 26, 2004, the entire content of which is incorporated herein by reference.

BACKGROUND OF THE INVENTION

1. Field of the Invention

The present invention relates to a liquid crystal display and a method for fabricating the same, and more particularly, to a liquid crystal display with a structure for easily forming a transition core of a liquid crystal layer by forming pixel electrodes having a certain tilt angle, and a method for fabricating the same.

2. Description of Related Art

A liquid crystal display is generally formed by laminating a first (or opposite) substrate, on which a common electrode, a color filter, etc. are formed, onto a second substrate, on which an array having a thin film transistor, wirings and pixel electrodes is formed, and then injecting liquid crystals into a space between the second substrate and the first (or opposite) substrate.

In a liquid crystal display, an electric field is applied between a pixel electrode and a common electrode, and liquid crystals are aligned by the electric field so that a light transmittance of the liquid crystals is controlled to display a gray scale. Because of this, viewing angles and display characteristics of the liquid crystal display depend on alignment of the liquid crystals.

Recently, an optically compensated bend (OCB) mode liquid crystal display of the liquid crystal displays has been actively studied due to its abilities for providing a wide viewing angle and a fast response speed. An OCB mode is a mode for aligning and driving a liquid crystal layer of a liquid crystal display in which a gray scale is displayed according to an orientation of liquid crystals in a bend state as an electric field is being applied after the liquid crystals are first changed from a splay state to the bend state.

Therefore, for the OCB mode liquid crystal display to properly represent images, it is important to uniformly change the alignment of all liquid crystals (or liquid crystal molecules) over a display surface of the OCB mode liquid crystal display from the splay state to the bend state. As such, a method for applying a high transition voltage (Vcr) has been developed to change the alignment of most of the liquid crystals over the display surface. However, this method has a problem in that a power consumption of the liquid crystal display is increased due to the high transition voltage (Vcr).

To reduce the power consumption, a method for forming a transition core of liquid crystals and changing an alignment of the liquid crystals around the transition core has been developed to change the alignment of most of the liquid crystals. As such, the formation of the transition core can reduce a transition voltage by increasing a pre-tilt angle of certain liquid crystals using an alignment film (or a structure of the film) for forming the transition core, thereby enabling the liquid crystals around the transition core to be changed and/or aligned more easily.

However, the increase of the pre-tilt angle described above has a problem in that a process for manufacturing the liquid crystal display is further complicated by the formation of the alignment film or the structure of a lower part of the alignment film.

SUMMARY OF THE INVENTION

An embodiment of the present invention easily forms a transition core of liquid crystals (or liquid crystalline molecules) by tilting one or more parts of one or more pixel electrodes using a structure formed on a substrate.

An embodiment of the present invention uniformly forms a transition core all over a plurality of pixels by tilting one or more parts of one or more pixel electrodes into a certain shape on a certain region of the pixels.

An embodiment of the present invention reduces power consumption of a display device and improves a response speed and a gray scale display capability of the display device by easily forming a transition core to thereby reduce a transition voltage.

One embodiment of the present invention provides a liquid crystal display including: a first substrate; scan lines arranged in a first direction on the first substrate; data lines arranged in a second direction such that the data lines cross the scan lines; pixel regions defined by the scan lines and the data lines; a thin film transistor region positioned on a cross region of the scan lines and the data lines such that the thin film transistor region is positioned over at least two of the pixel regions; pixel electrodes overlapped with at least a part of the thin film transistor region while being positioned on the pixel regions; a second opposite substrate positioned apart from the first substrate and equipped with a common electrode, the second substrate opposing the first substrate; and a liquid crystal layer interposed between the first substrate and the second substrate.

The liquid crystal layer may include an optically compensated bend (OCB) mode liquid crystal layer.

The liquid crystal display may further include an alignment film interposed between the liquid crystal layer and the pixel electrodes, wherein the alignment film has a linear pre-tilt angle.

A region of the pixel electrodes overlapped with the part of the thin film transistor region may have a tilt angle.

The thin film transistor region may be positioned over at least four of the pixel regions.

A surface level difference between at least one of the pixel electrodes on an upper part of a thin film transistor corresponding to the thin film transistor region and the at least one of the pixel electrodes on a light emitting region of the first substrate is from about 0.2 to 1 µm.

One embodiment of the present invention provides a method for fabricating liquid crystal display. The method includes: forming scan lines arranged in a first direction on a first substrate; forming data lines arranged in a second direction crossing the scan lines; forming a thin film transistor connected to the signal lines and corresponding to a thin film transistor region; forming pixel regions defined by the scan lines and the data lines, the thin film transistor being positioned over at least two of the pixel regions and on a cross region of the scan lines and the data lines; forming pixel electrodes on the pixel regions such that the pixel electrodes are overlapped with at least a part of the thin film transistor region and connected with the thin film transistor; forming a common electrode on a second substrate; positioning the second substrate apart from the first substrate, the second substrate opposing the first substrate; and injecting a liquid crystal layer between the first substrate and the second substrate.

BRIEF DESCRIPTION OF THE DRAWINGS

The accompanying drawings, together with the specification, illustrate exemplary embodiments of the present invention, and, together with the description, serve to explain the principles of the invention.

Figure 1:
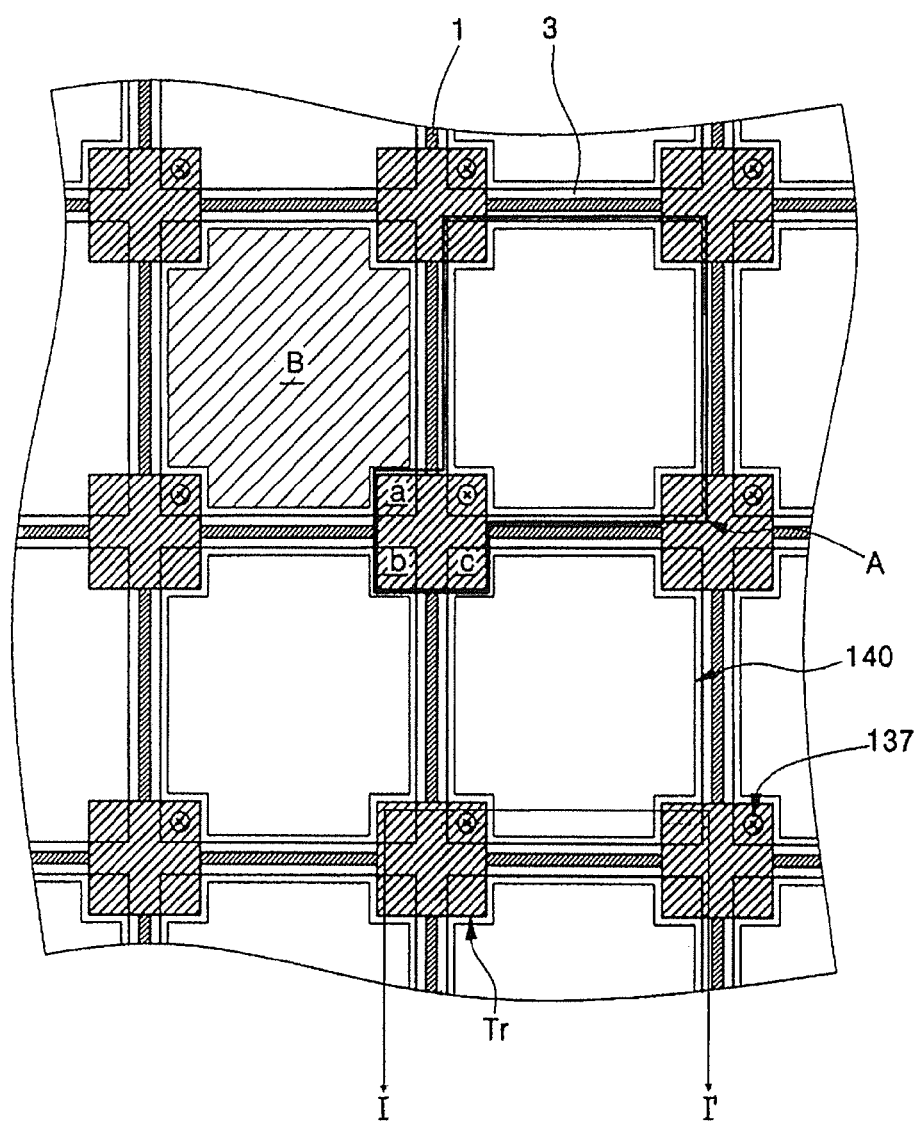
FIG. 1 is a plan view of an array substrate according to an embodiment of the present invention.

Explanation of marks for certain parts of drawings:

| 100: | substrate | 110: | gate electrode |
|---|---|---|---|
| 115: | gate insulation layer | 120: | semiconductor layer |
| 130a: | source electrode | 130b: | drain electrode |
| 135: | insulation layer | 140: | pixel electrode |
| 145, 225: | alignment film | 205: | black matrix |
| 210a, 210b: | color filter | 215: | common electrode |

DETAILED DESCRIPTION

In the following detailed description, exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive. There may be parts shown in the drawings, or parts not shown in the drawings, that are not discussed in the specification, as they are not essential to a complete understanding of the invention. Like reference numerals designate like elements. In the drawings, length of layers and regions, thickness, etc. can be exaggerated for convenience of understanding.

Figure 4:
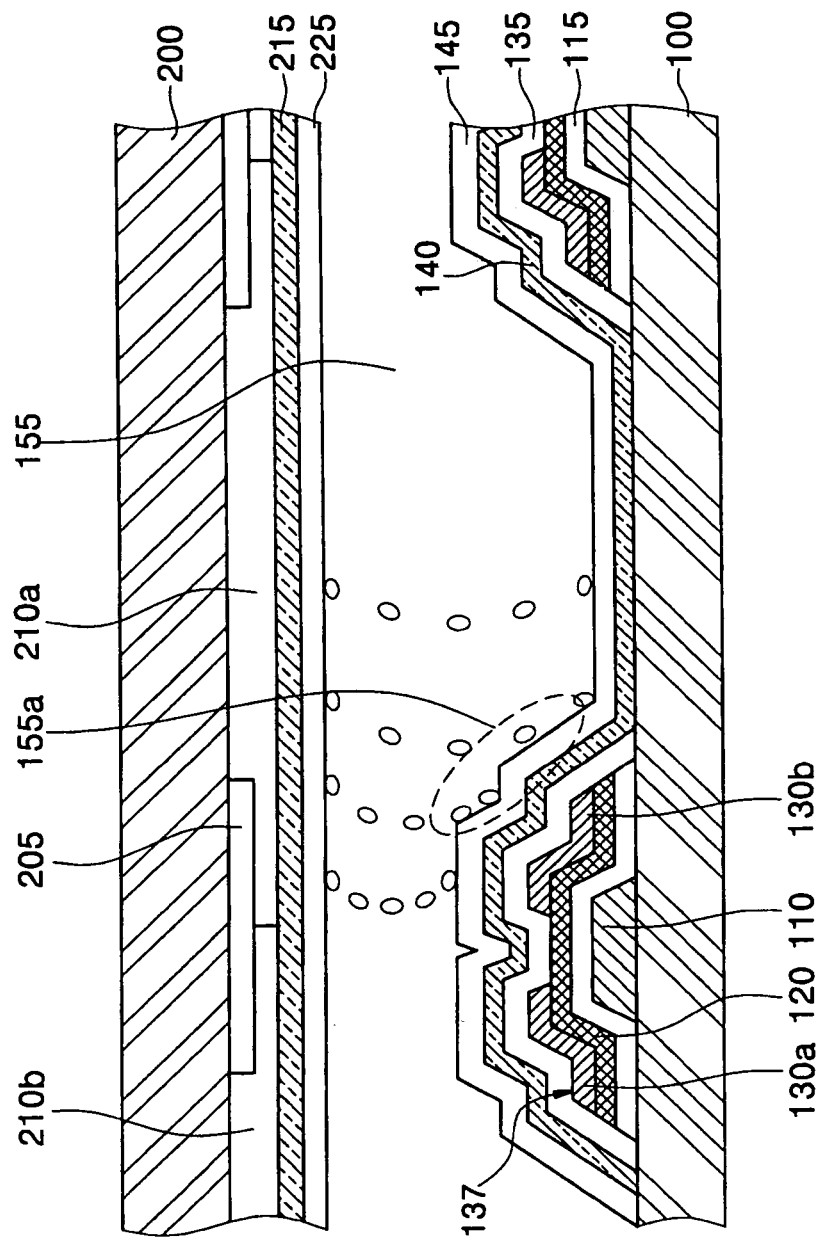
FIG. 4 is a cross-sectional view of a liquid crystal display according to an embodiment of the present invention.

FIG. 1 is a plan view of an array substrate according to an embodiment of the present invention, and FIG. 4 is a cross-sectional view of a liquid crystal display including the array substrate of FIG. 1 taken along the cutting line I-I' of FIG. 1 according to an embodiment of the present invention.

Referring to FIG. 1, scan lines 1 are arranged in a first direction on a substrate, and data lines 3 are positioned in a second direction such that the data lines 3 cross the scan lines 1. Pixel regions A are defined by the scan lines 1 and the data lines 3. Each of the pixel regions A includes a thin film transistor region Tr connected to a corresponding pixel electrode 140 of the pixel regions A.

A thin film transistor region Tr is positioned on a cross region of the scan lines 1 and the data lines 3. That is, each of the thin film transistor region Tr is connected to a corresponding scanning signal line 1 that functions as a gate line and a corresponding data line 3 that functions as a source line so that the thin film transistor region Tr is activated/de-activated according to signals inputted from the corresponding scan and data lines 1, 3.

Further, the thin film transistor region Tr is positioned over at least two pixel regions of the pixel regions A.

Pixel electrodes 140 are positioned on the pixel regions A, and the pixel electrodes 140 are overlapped with at least a part of the thin film transistor regions Tr. Furthermore, the pixel electrodes 140 of respective pixels adjacent to the thin film transistor regions Tr can be overlapped with at least one of parts a, b, c of four corners of the thin film transistor regions Tr.

A portion of the pixel electrodes 140, which can be overlapped with the at least one of parts a, b and c of four corners of the thin film transistor regions Tr, has a certain tilt (or slope). Further, four corner parts (at crossings) of the pixel electrodes 140 are overlapped with at least two parts (e.g., the parts a, b, c) of the thin film transistor regions Tr, and the corner parts of the pixel electrodes 140 have a certain tilt (or slope).

Referring to FIG. 4, a structure of the liquid crystal display according to the present invention is described in more detail as follows. A gate electrode 110 is positioned on a substrate 100. A gate insulation layer 115 is positioned on the gate electrode 110, and a semiconductor layer 120 corresponding to the gate electrode 110 is positioned on the gate insulation layer 115. Furthermore, the gate insulation layer 115 can be patterned (or formed into a predetermined pattern). A source electrode 130a and a drain electrode 130b are positioned such that they are contacted with a part of the semiconductor layer 120.

An insulation layer 135 is positioned on a thin film transistor C including the semiconductor layer 120, the gate electrode 110, the source electrode 130a and the drain electrode 130b. The insulation layer 135 can be a passivation layer, which can be patterned.

A pixel electrode 140 connected to the drain electrode 130b of the thin film transistor C is positioned on the insulation layer 135.

An opposite substrate 200 equipped with a common electrode 215 is positioned over the substrate 100 equipped with the thin film transistor C and the pixel electrode 140. A black matrix 205 is positioned on the opposite substrate 200, and color filters 210a, 210b are interposed between the opposite substrate 200 and the common electrode 215.

Alignment films 145, 225 are respectively positioned on an upper part of the pixel electrode 140 and the common electrode 215, and a liquid crystal layer 155 is interposed between the alignment films 145, 225.

The liquid crystal layer 155 can be an OCB mode liquid crystal layer and have a pre-tilt angle.

Pixel electrodes (e.g., the pixel electrodes 140) of respective pixels adjacent to a thin film transistor part are overlapped with parts (e.g., the parts a, b, and c of FIG. 1) of four corners of the thin film transistor part. The pixel electrodes (e.g., the pixel electrodes 140) have surface level differences due to a surface level difference of a lower film on the parts (e.g., the parts a, b and c of FIG. 1) on which the pixel electrodes are overlapped with the thin film transistor, and the surface level differences form a tilt.

In one embodiment, a surface level difference between a pixel electrode on an upper part of the thin film transistor and a pixel electrode on a light emitting region of a substrate (e.g., the light emitting region B) is from 0.2 to 1 μm. A tilt angle of the pixel electrode can be adjusted by adjusting the surface level difference. A liquid crystal (e.g., a liquid crystal of liquid crystals 155a) of a liquid crystal layer (e.g., the liquid crystal layer 155) positioned adjacent to a tilted part of the pixel electrode (e.g., the pixel electrode 140) can have a tilt angle obtained by adding a pre-tilt angle of the liquid crystal layer and a tilt angle of the pixel electrode.

The tilt angle of the pixel electrode increases an orientation angle of liquid crystals existing on a portion that corresponds to the tilt angle of the pixel electrode resulting in an easy transition of the liquid crystals as compared with liquid crystals existing on a portion that does not correspond to the tilt angle of the pixel electrode so that the tilt angle of the pixel electrode acts to form a transition core functioning as a catalyst during a transition of the other liquid crystals. Therefore, a transition core of liquid crystal molecules can be easily formed by forming a tilt on a part of the pixel electrode using a tilt structure formed by a thin film transistor formed on a substrate (e.g., the substrate 100). As such, the transition core of the liquid crystals, which is easily formed, reduces a transition voltage, and thereby reduces a power consumption of a display device having the transition core. Further, the formation of the transition core increases a transition speed to thereby improve a response speed and a gray scale display capability of the display device.

Since a transition core is formed on a certain area of a certain region of a pixel electrode, an equal transition core can similarly be formed on all pixels of a display device. Accordingly, in one embodiment, by inducing a transition of uniform liquid crystals in each of the pixels to form a uniform orientation on all the pixels of the display device, the embodiment further improves a gray scale capability of the display device.

Owing to a surface level difference of an embodiment of the invention, liquid crystals positioned adjacent to a region of pixel electrodes formed on an upper part of a thin film transistor receive a stronger electric field as compared with liquid crystals positioned adjacent to a light emitting region of a substrate (e.g., the substrate 100). Therefore, a liquid crystal layer positioned on an upper part of the thin film transistor becomes a transition core that induces a transition of the other liquid crystals to thereby reduce a transition voltage.

Figure 2:
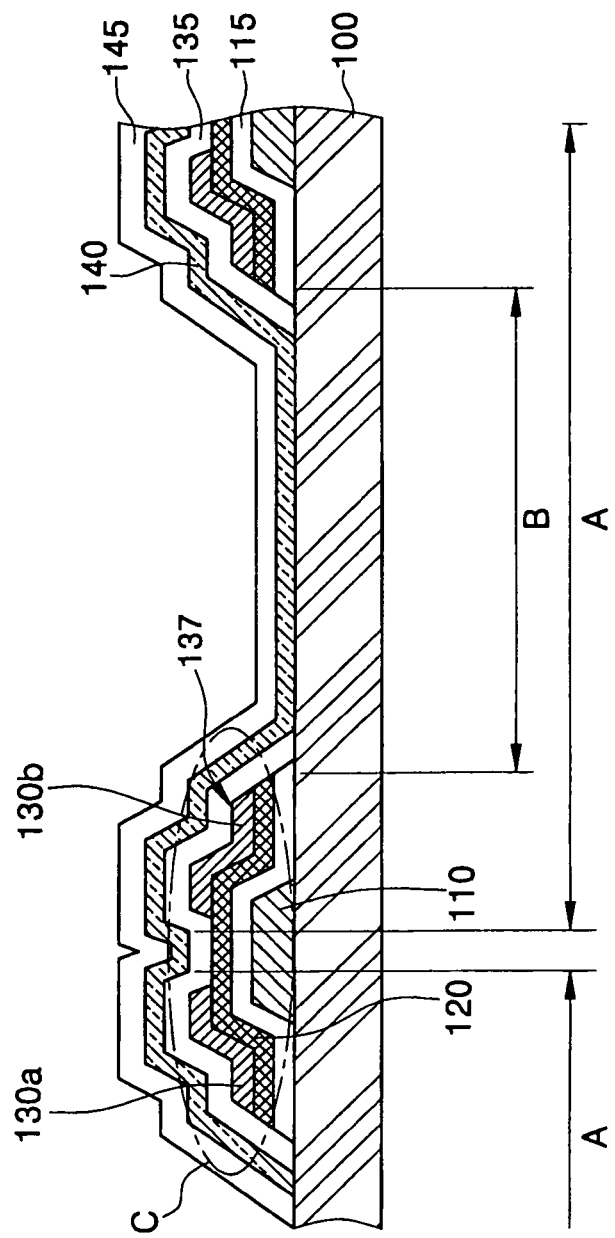
FIG. 2 is a cross-sectional view taken along the cutting line I-I' of FIG. 1.
Figure 3:
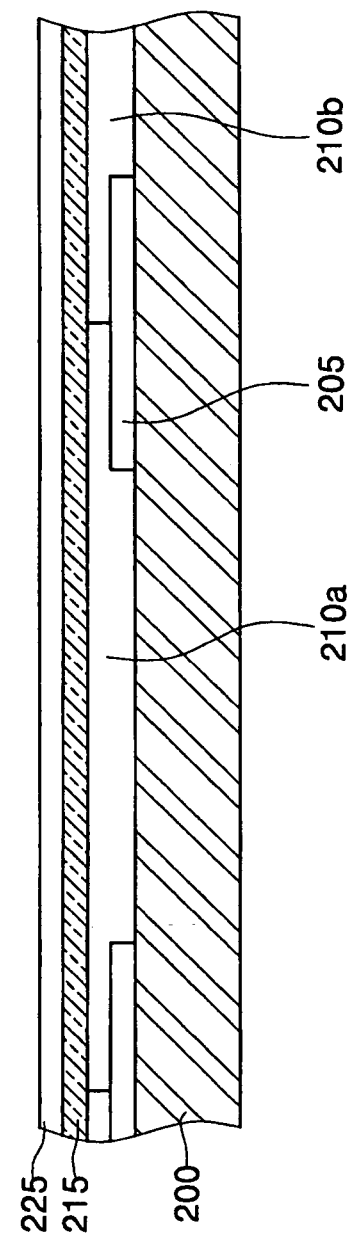
FIG. 3 is a cross-sectional view for showing an oppositely directed substrate.

Referring to FIGS. 2 and 3, a method for fabricating a liquid crystal display according to an embodiment of the present invention is described in more detail as follows.

FIG. 2 is a cross-sectional view of the array substrate taken along the cutting line I-I' of FIG. 1.

Referring to FIG. 2, a thin film transistor C of each of pixel regions is formed on a substrate 100 equipped with the pixel regions (e.g., the pixel regions A of FIG. 1). The thin film transistor C is formed on a thin film transistor region (e.g., the thin film transistor region Tr of FIG. 1) on a cross region of scan lines (e.g., the scan lines 1 of FIG. 1) and data lines (e.g., the data lines 3 of FIG. 1) such that the thin film transistor C is positioned over at least two or more pixel regions of the pixel regions.

That is, a gate electrode 110 is formed by patterning a conductive film after depositing the conductive film on the substrate 100. A gate insulation layer 115 is formed on the gate electrode 110. The gate insulation layer 115 can be formed using a silicon oxide film and can be patterned onto the gate electrode 110. Because of this, the gate insulation layer 115 can allow light generated from a backlight unit under the substrate 100 to pass through.

A semiconductor layer 120 is formed by patterning an amorphous silicon film deposited on the gate insulation layer 115 or patterning a polycrystalline silicon film after crystallizing the amorphous silicon film into the polycrystalline silicon film. The thin film transistor C is formed by patterning a conductive film to form a source electrode 130a and a drain electrode 130b after depositing the conductive film on the semiconductor layer 120.

An insulation layer 135 is formed on the substrate 100 and on which the thin film transistor C is formed, and a via hole 137 for exposing the drain electrode 130b is formed in the insulation layer 135. The insulation layer 135 can be a passivation layer or a silicon nitride film. The passivation layer can be patterned (or formed into a predetermined pattern). Because of this, the insulation layer 135 can allow light generated from the back light unit under the substrate 100 to easily pass through.

After depositing a conductive film on the insulation layer 135 and patterning the conductive film, a pixel electrode 140 is formed in such a manner that the pixel electrode 140 is connected to the drain electrode 130b of the thin film transistor C and partially covers an upper part of the gate electrode 110 of the thin film transistor C. An alignment film 145 is formed on the substrate 100 on which the pixel electrode 140 is formed.

After forming the pixel electrode 140, the pixel electrode 140 is connected to the thin film transistor C under the pixel electrode 140 by patterning a conductive film after forming the via hole 137 inside the insulation layer 135 and depositing the conductive film on the insulation layer 135. The pixel electrodes (e.g., the pixel electrodes 140 of FIG. 1) of respective pixels adjacent to the thin film transistor region (e.g., the thin film transistor region Tr of FIG. 1) are formed such that the pixel electrodes are overlapped with at least two or more parts of the thin film transistor region. That is, two or more parts of the pixel electrode of one pixel are overlapped with the thin film transistor region due to the thin film transistor region being formed in such a manner that it is positioned over four pixel regions. Furthermore, the pixel electrodes of the respective pixels adjacent to the thin film transistor region can be formed in such a way that the pixel electrodes are overlapped with a part of four corners (e.g., the parts a, b and c of FIG. 1) of the thin film transistor region.

Therefore, a portion of the pixel electrode 140 of FIG. 2 overlapped with a part of the four corners of the thin film transistor region has a tilt due to a surface level difference of the pixel electrode 140. An alignment film 145 is then formed on the pixel electrode 140.

FIG. 3 is a cross-sectional view for showing an oppositely directed substrate.

Referring to FIG. 3, a black matrix 205 for defining pixels is first deposited on an opposite substrate 200 facing the substrate 100 of FIGS. 1, 2, 4. Color filters 210a, 210b are formed on the black matrix 205 formed on substrate 200. A common electrode 215 is formed on the color filters 210a, 210b. The common electrode 215 can be formed using indium tin oxide (ITO). An alignment film 225 is formed on the common electrode 215.

As discussed above, FIG. 4 is a cross-sectional view of the liquid crystal display including the array substrate of FIG. 1 taken along the cutting line I-I' of FIG. 1.

Referring again to FIG. 4, the liquid crystal layer 155 is injected into a space between the substrate 100 and the opposite substrate 200 after sealing the substrate 100 and the opposite substrate 200 such that the substrate 100 of FIG. 2 and the opposite substrate 200 of FIG. 3 face the alignment films 145, 225.

The liquid crystal layer 155 can be an OCB mode liquid crystal layer. Furthermore, the liquid crystal layer 155 is aligned such that the liquid crystal layer 155 has a certain pre-tilt angle. For example, the liquid crystal layer 155 can be adjusted to obtain a certain pre-tilt angle by adjusting a strength and/or a direction of rubbing of the alignment films 145, 225 when the films 145, 225 are being formed.

The liquid crystal of liquid crystals 155a positioned at a tilt part of the pixel electrode 140 has a tilt angle obtained by adding a pre-tilt angle of the liquid crystal layer 155 and a tilt angle of the pixel electrode 140.

That is, a tilt having a certain angle is formed at four corner parts of the pixel electrode 140 by a surface level difference of the pixel electrode 140 formed due to a lower structure of the pixel electrode 140, and the liquid crystal of the liquid crystals 155a adjacent to a portion of the pixel electrode 140 at which the tilt is formed obtains a pre-tilt angle that is higher than that of a pre-tilt angle of a liquid crystal not adjacent to the portion.

In one embodiment, a surface level difference between a pixel electrode on an upper part of a thin film transistor and a pixel electrode on a light emitting region of a substrate (e.g., the substrate 100 of FIG. 2) is from 0.2 to 1 μm. Because of this, the tilt angle of the pixel electrode can be adjusted by adjusting the surface level difference.

The tilt angle of the pixel electrode increases an orientation angle of liquid crystals existing on a portion that corresponds to the tilt angle of the pixel electrode, resulting in an easy transition of the liquid crystals as compared with liquid crystals existing on a portion that does not correspond to the tilt angle of the pixel electrode so that the tilt angle of the pixel electrode acts to form a transition core functioning as a catalyst during a transition of the other liquid crystals. Therefore, a transition core of liquid crystal molecules is easily formed by forming a tilt on a part of the pixel electrode using a tilt structure formed by a thin film transistor formed on a substrate. As such, the transition core of the liquid crystals, which is easily formed, reduces a transition voltage, and thereby reduces a power consumption of a display device having the transition core. Further, the formation of the transition core increases a transition speed to thereby improve a response speed and a gray scale display capability of the display device.

Since a transition core is formed on a certain area of a certain region of a pixel electrode, an equal transition core can similarly be formed on all pixels of a display device. Accordingly, in one embodiment, by inducing a transition of uniform liquid crystals in each of the pixels to form a uniform orientation on all the pixels of the display device, the embodiment further improves a gray scale capability of the display device.

Owing to a surface level difference of an embodiment of the invention, liquid crystals positioned adjacent to a region of pixel electrodes formed on an upper part of a thin film transistor receive a stronger electric field as compared with liquid crystals positioned adjacent to a light emitting region of a substrate (e.g., the substrate 100 of FIG. 2). Therefore, a liquid crystal layer positioned on an upper part of the thin film transistor becomes a transition core that induces a transition of the other liquid crystals to thereby reduce a transition voltage.

A liquid crystal display according to an embodiment of the present invention easily forms a transition core of liquid crystals by forming a tilt on one or more parts of one or more pixel electrodes using a structure formed on a substrate.

Further, a liquid crystal display according to an embodiment of the present invention has a transition core that can be uniformly formed in each of a plurality of pixels by forming a tilt in a certain shape on one or more parts of one or more pixel electrodes on a certain region of each of the pixels.

Further, in a liquid crystal display according to an embodiment of the present invention, a liquid crystal layer existing on an upper region of a thin film transistor becomes a transition core to increase an electric field according to a surface level difference of a pixel electrode, and the transition core further induces a transition of liquid crystals existing around the transition core to reduce a transition voltage of the liquid crystals.

Therefore, in view of the foregoing, a liquid crystal display according to an embodiment of the present invention reduces a power consumption of the liquid crystal display and improves a response speed and gray scale display capability of the liquid crystal display by easily forming a transition core to thereby reduce a transition voltage.

While the invention has been shown and/or described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A liquid crystal display comprising:
a first substrate;
a plurality of scan lines arranged in a first direction on a surface of the first substrate;
a plurality of data lines arranged in a second direction such that the data lines cross the scan lines;
a plurality of pixel regions defined by the scan lines and the data lines;
a plurality of thin film transistor regions respectively positioned on cross regions of the scan lines and the data lines such that one thin film transistor region of the thin film transistor regions is positioned over at least two of the pixel regions, each of the thin film transistor regions comprising a semiconductor layer with four corners;
a plurality of pixel electrodes on the pixel regions, each of the pixel electrodes having at least four corners, at least one of the at least four corners of each of the pixel electrodes having a vertex and a tilted portion including the vertex, the tilted portion being tilted away from the surface of the first substrate and overlapping with one of the four corners of the semiconductor layer of a corresponding one of the thin film transistor regions;
a second substrate positioned apart from the first substrate and equipped with a common electrode, the second substrate opposing the first substrate; and
a liquid crystal layer interposed between the first substrate and the second substrate,
wherein each of the four corners of the semiconductor layer overlaps with one of the at least four corners of one of the pixel electrodes that is different from the pixel electrodes overlapping with other ones of the four corners of the semiconductor layer.

2. The liquid crystal display according to claim 1, wherein the liquid crystal layer comprises an optically compensated bend (OCB) mode liquid crystal layer.

3. The liquid crystal display according to claim 1, further comprising an alignment film interposed between the liquid crystal layer and the pixel electrodes, wherein the alignment film comprises a linear pre-tilt angle.

4. The liquid crystal display according to claim 1, wherein the thin film transistor region is positioned over at least four of the pixel regions.

5. The liquid crystal display according to claim 1, wherein the thin film transistor region is equipped with a patterned insulation layer.

6. The liquid crystal display according to claim 5, wherein the patterned insulation layer comprises a gate insulation layer.

7. The liquid crystal display according to claim 1, wherein the liquid crystal display further comprising a passivation layer interposed between a thin film transistor corresponding to the thin film transistor region and a region of the at least four corners of the pixel electrodes overlapping a part of the thin film transistor region.

8. The liquid crystal display according to claim 7, wherein the passivation layer comprises a patterned passivation layer.

9. The liquid crystal display according to claim 1, wherein a surface level difference between a portion of at least one of the pixel electrodes on an upper part of a thin film transistor corresponding to the thin film transistor region and another portion of the at least one of the pixel electrodes on a light emitting region of the first substrate is between about 0.2 μm and 1 μm.

10. A method for fabricating a liquid crystal display, the method comprising:
    forming a plurality of scan lines arranged in a first direction on a surface of a first substrate;
    forming a plurality of data lines arranged in a second direction crossing the scan lines;
    forming a plurality of thin film transistors connected to the scan lines and the data lines, each of the thin film transistors corresponding to a thin film transistor region, the thin film transistor region comprising a semiconductor layer with four corners;
    forming a plurality of pixel regions defined by the scan lines and the data lines, one thin film transistor of the thin film transistors being positioned over at least two of the pixel regions and on a cross region of the scan lines and the data lines;
    forming a plurality of pixel electrodes on the pixel regions, each of the plurality of pixel electrodes having at least four corners and at least one of the at least four corners of the pixel electrodes having a vertex and a tilted portion including the vertex, the tilted portion being tilted away from the surface of the first substrate and overlapped with one of the four corners of the semiconductor layer of a corresponding one of the thin film transistors, each of the plurality of pixel electrodes being connected with a corresponding one of the thin film transistors, wherein each of the four corners of the semiconductor layer overlaps with one of the at least four corners of one of the pixel electrodes that is different from the pixel electrodes overlapping with other ones of the four corners of the semiconductor layer;
    forming a common electrode on a second substrate;
    positioning the second substrate apart from the first substrate, the second substrate opposing the first substrate; and
    injecting a liquid crystal layer between the first substrate and the second substrate.

11. The method for fabricating the liquid crystal display according to claim 10, wherein the liquid crystal layer comprises an optically compensated bend (OCB) liquid crystal.

12. The method for fabricating the liquid crystal display according to claim 10, further comprising rubbing first and second alignment films such that the first and second alignment films each comprises a pre-tilt angle, and forming the first alignment film on the pixel electrodes and the second alignment film on the common electrode before the injecting of the liquid crystal layer between the first substrate and the second substrate.

13. The method for fabricating the liquid crystal display according to claim 10, wherein the thin film transistor region is formed such that the thin film transistor region is positioned over at least four of the pixel regions.

14. The method for fabricating the liquid crystal display according to claim 10, further comprising patterning an insulation layer composing the thin film transistor on the thin film transistor region.

15. The method for fabricating the liquid crystal display according to claim 14, wherein the patterning of the insulation layer comprises patterning a gate insulation layer.

16. The method for fabricating the liquid crystal display according to claim 10, further comprising forming a passivation layer on the thin film transistor of the thin film transistor region, and forming the pixel electrodes on the passivation layer.

17. The method for fabricating the liquid crystal display according to claim 16, further comprising patterning the passivation layer.

18. The method for fabricating the liquid crystal display according to claim 10, wherein a surface level difference between a portion of at least one of the pixel electrodes on an upper part of the thin film transistor and another portion of the at least one of the pixel electrodes on a light emitting region of the first substrate is between about 0.2 μm and 1 μm.

* * * * *